United States Patent [19]

Meginnis, deceased

[11] Patent Number: 4,468,095
[45] Date of Patent: Aug. 28, 1984

[54] SIGHT GLASS ASSEMBLY

[75] Inventor: Charles E. Meginnis, deceased, late of Charleston, W. Va., by Stanley T. McKeny, executor

[73] Assignee: Pressure Products Company, Inc., Charleston, W. Va.

[21] Appl. No.: 353,926

[22] Filed: Mar. 2, 1982

[51] Int. Cl.³ .......................... G02B 5/00; G01F 23/02
[52] U.S. Cl. ........................................ 350/319; 73/334
[58] Field of Search ................. 350/319, 589, 252; 73/334, 328–331, 326

[56] References Cited

U.S. PATENT DOCUMENTS

| | | | |
|---|---|---|---|
| 3,941,460 | 3/1976 | Meginnis | 350/319 |
| 3,942,881 | 3/1976 | Meginnis | 350/319 |
| 4,182,179 | 1/1980 | Meginnis | 73/334 |
| 4,372,652 | 2/1983 | Pontefract | 350/319 |

Primary Examiner—Jon W. Henry
Attorney, Agent, or Firm—Lalos, Leeds, Keegan, Lett, Marsh, Bentzen & Kaye

[57] ABSTRACT

A sight glass assembly comprising a first housing section having an opening therethrough, mountable on a vessel wall having an opening therethrough so that the first housing section opening registers with the vessel wall opening, the opening of the first housing section having an enlarged section, a second housing section cooperable with the first housing section, having an opening therethrough registered with the opening in the first housing section, the opening in the second housing section having an enlarged section disposed in opposed relation to the enlarged section of the opening in the first housing section, a lens disposed across the openings having the periphery thereof disposed between the housing sections and received within the enlarged sections of the openings in the housing sections, a sealing ring assembly disposed in the enlarged sections of the housing section openings, included a rigid compression ring and a resilient packing member, the compression ring being engageable with one of the housing sections, the packing member having an L-shaped cross-sectional configuration including an annular wall portion mounted on an inner side of the compression ring and engaging the periphery of the lens and a flange portion mounted on an end of the compression ring and engaging the other of the housing sections, and means for urging the housing sections together so that the compression ring will be forced against the packing member, causing it to expand laterally, thereby effecting a seal between the periphery of the lens and the housing sections and placing the lens in radial compression.

10 Claims, 3 Drawing Figures

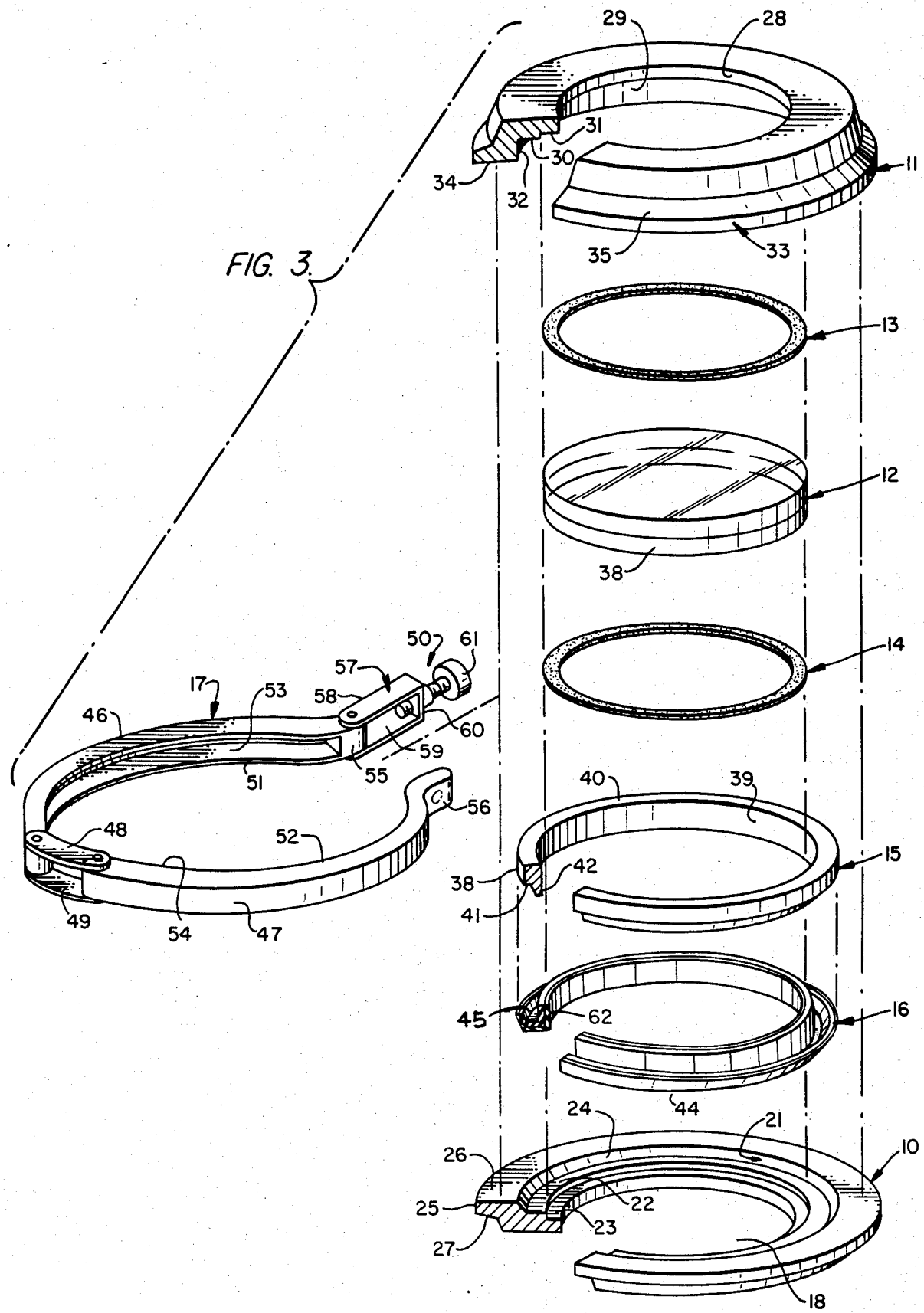

SIGHT GLASS ASSEMBLY

This invention relates to sight glass assembly and more particularly to the type of assembly disclosed in U.S. Pat. No. 3,941,460.

In the aforementioned patent, there is disclosed a sight glass assembly generally including a pair of cooperating housing sections having a pair of aligned openings registrable with an opening on a vessel wall when the assembly is mounted on such a wall, a lens mounted between the housing sections across the openings therein, a packing member disposed between the peripheral sidewall of the lens and the housing sections, and means for clamping the housing sections together, causing the packing member to expand radially to provide a seal between the periphery of the lens and the housing sections and to place the lens in radial compression. While such type of assembly has been effective in performance, particularly in providing a sight glass assembly of the type in which the lens is placed in radial compression, which may be readily disassembled and assembled in replacing defective components with a minimum of down time, it has been found to be desirable to provide such type of sight glass assembly in which more positive sealing is provided between the lens and the housing sections and a greater compressive force is applied to the lens.

Accordingly, it is the principal object of the present invention to provide an improved sight glass assembly.

Another object of the present invention is to provide an improved sight glass assembly of the type in which the lens thereof is placed in radial compression for preventing the blowout of the lens when the lens becomes fractured.

A further object of the present invention is to provide an improved sight glass assembly of the type utilizing a packing member which is expanded laterally to form a fluid-tight seal between the seal and housing structure thereof and to place the lens in radial compression.

A still further object of the present invention is to provide an improved sight glass assembly of the type consisting of a pair of cooperating housing sections, a lens mounted between the housing sections, a packing member mounted between the periphery of the lens and the housing sections and means for forcing the housing sections together against the packing member to cause it to expand radially to effect a seal between the periphery of the lens and the housing sections and to place the lens in radial compression, in which a more effective seal between the periphery of the lens and the housing sections is provided and a greater compressive force is applied to the periphery of the lens.

Other objects and advantages of the present invention will become more apparent to those persons having ordinary skill in the art to which the present invention relates from the following description taken in conjunction with the accompanying drawings wherein:

FIG. 3 is an exploded view of the embodiment illustrated in FIGS. 1 and 2.

Figure 1:
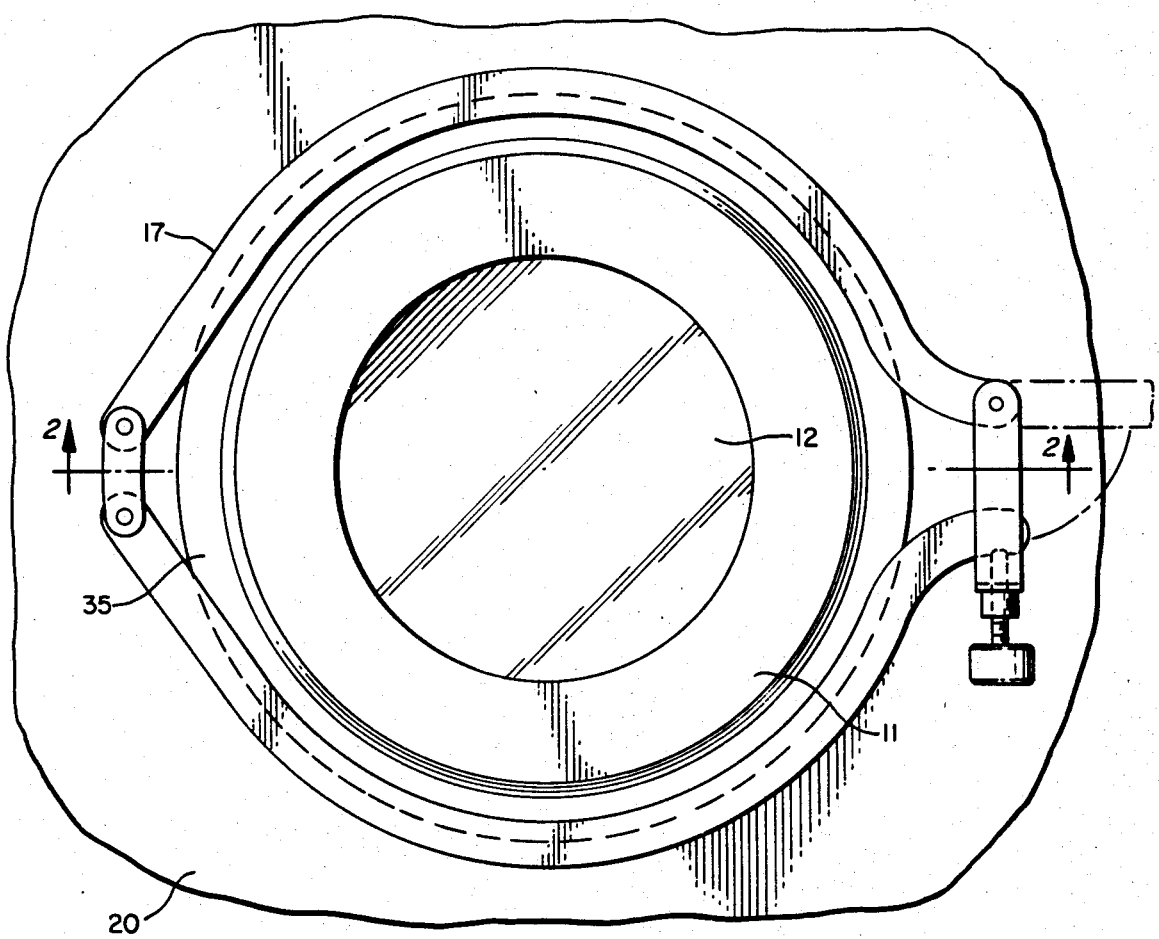
FIG. 1 is a top plan view of an embodiment of the invention.

The assembly illustrated in the drawings generally includes an inner housing section 10 and an outer housing section 11, a lens 12, a set of gaskets 13 and 14, a sealing ring assembly consisting of a rigid compression ring 15 and a packing member 16 mounted on the compression ring and a clamping assembly 17.

Figure 2:
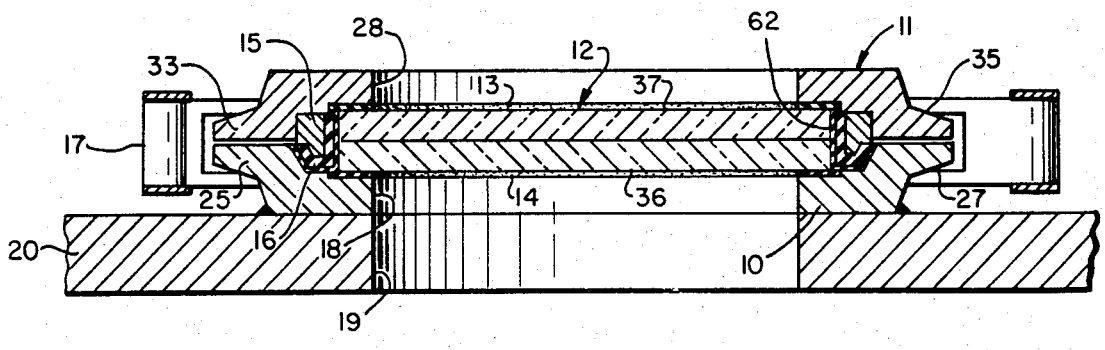
FIG. 2 is a cross-sectional view taken along line 2—2 of FIG. 1.

Inner housing section 10 generally has an annular configuration providing an opening 18 therein adapted to register with an opening 19 in a wall 20 of a vessel containing a fluid possibly corrosive in nature and at an elevated temperature and pressure. As best illustrated in FIG. 2, the inner housing section is secured to the fluid vessel by welding. Opening 15 in the inner housing section is provided with an enlarged section 21 which provides an annular seating surface 22 having a recess 23 and a frusto-conically configured bearing surface 24. Inner housing member 10 further is provided with a laterally projecting annular flange portion 25 which includes a mating surface 26 disposed substantially perpendicular to the axis of opening 18 and a frusto-conically shaped clamp bearing surface 27. Recess 23 in annular bearing surface 22 is adapted to seat gasket 14.

Outer housing section 11 is similar in configuration to inner housing section 10 and includes an opening 28 therein which registers with opening 18 in the inner housing section. Opening 28 is provided with an enlarged section 29 having an annular bearing surface 30 provided with a recess 31 and an annular wall 32. Outer section 11 further is provided with a laterally projecting annular portion 33 having an annular mating surface 34 disposed in opposed relation to mating surface 26 and a frusto-conically shaped clamp bearing surface 35. Recess 31 in annular bearing surface 30 is adapted to receive gasket 13.

Referring to FIG. 2, lens 12 is mounted within the housing structure between gaskets 13 and 14, having the peripheral portion of inner surface 36 seated on gasket 14, the peripheral portion of outer surface 37 engaging gasket 13, and the peripheral side surface 38 thereof being spaced from annular wall 32 of the enlarged section of the opening in the upper housing section and frusto-conically shaped surface 24 of the enlarged section of the opening in the lower housing section to provide an annular space between the lens and the housing structure in which the sealing ring assembly is mounted.

Compression ring 15 includes an outer annular surface 38 engageable with annular wall 32 of the upper housing structure, an inner annular wall 39, an outer end wall 40 engaging annular wall 30 of the outer housing section and an inner end wall 41 having an inwardly projecting, annular protrusion 42. Packing member 16 has a substantially L or J-shaped cross-sectional configuration including an annular wall portion 43 mounted on inner annular surface 39 of the compression ring and engaging peripheral surface 38 of the lens and flange portion 44 mounted on inner end surface 41 of the compression ring and engaging seating surface 22 and frusto-conically configured bearing surface 24 of the inner housing section. The flange portion of the packing member further is provided with an annular recess 45 which is adapted to receive annular protrusion 42 of the compression ring when the packing member is mounted on the compression ring. The packing member may be simply fitted on the compression ring or the flange portion thereof may be adhesively secured to the compression ring, as may be desired.

It will be appreciated that with the lens and sealing ring assembly mounted between the housing sections, the housing sections may be forced together, causing the compression ring to compress the packing member, and the packing member to expand laterally, thereby forming a fluid-tight seal between the periphery of the lens and the housing structure and placing the lens in radial compression.

The housing sections are forced together by clamping assembly 17 which consists of a pair of arcuately shaped clamping members 46 and 47 hinged together at one set of ends by a pair of hinge elements 48 and 49 and connected together at an opposite set of ends by a fastening device 50. The inner surfaces 51 and 52 of the clamping members are provided with recesses 53 and 54 having converging surfaces engageable with clamp bearing surfaces 27 and 35 of the housing sections when the clamping assembly is mounted on the housing sections with the laterally projecting portions 25 and 33 thereof received in recesses 53 and 54 of the clamping members. The end of the clamping members, opposite the hinged ends thereof, are provided with opposed end portions 55 and 56 which cooperate with the fastening device 50 to draw the clamping members together and correspondingly cause them to engage the housing sections in clamping relation. Fastening device 50 includes a strap member 57 having a pair of spaced leg portions 58 and 59 pivotally connected to end portion 55 and interconnected at the opposite ends thereof by a web portion 60. Mounted on web portion 60 is a threaded element in which there is threaded a screw 61 extending through the web portion of strap 57. Screw 61 is provided with an enlarged end portion which may be turned manually to thread the screw into and out of the space between the leg portions of the strap. It will be seen that when clamping members 51 and 52 are mounted on the housing sections with flanged portions 25 and 33 received within recesses 53 and 54, the connecting device may be manipulated so that the end portion 56 of the clamping member 52 is received within the strap portion of the connecting device and the screw may be turned so that the end of the screw engages clamp end portion 56 to draw the clamping members together and correspondingly clamp the housing sections together.

As previously mentioned, inner housing section 10 usually is secured to vessel wall 20 by welding. To assemble the unit as described, gasket 14 is first inserted in the mounted inner housing section and seated in recess 23. The sealing ring assembly, consisting of the packing member mounted on the compression ring as a unit, is then inserted in the mounted inner housing and seated on annular seating surface 22 and frusto-conically configured surface 24. The lens is next inserted in the sealing ring assembly and seated on gasket 14. With the lens and sealing ring assembly thus mounted in the inner housing section, the outer housing section with gasket 13 seated in recess 31 is mounted on the sealing ring assembly so that mating surface 34 is disposed in opposed relation to mating surface 26. The clamping assembly is then mounted on the housing sections, forcing them together and thus forming the seal between the periphery of the lens and the housing structure and placing the lens in radial compression.

To disassemble the unit, the procedure as described essentially is reversed. The clamping assembly is first removed, the outer housing section is next removed, and then the defective lens or sealing ring assembly is removed. The replacement components may then be mounted on the inner housing assembly and the rest of the components may be assembled as previously described.

The housing sections and the clamping assembly may be constructed of any suitable materials having appropriate strength characteristics. The compression ring also may be fabricated from any type of rigid material, although it is preferred that such component be formed of a corrosive resistant material, such as stainless steel. The packing member can be formed of any commercially available elastomer. Since most commercially available elastomers are not impervious to attack by corrosive agents which may be present in the vessel on which the sight glass assembly is mounted, it is preferred that a protective liner, illustrated at 62 in FIGS. 2 and 3, be used with the assembly to shield the packing member from the possible corrosive effects of the fluid contained within the vessel. Preferably, such liner would consist of a thin, pliable corrosive resistant material, such as Teflon. The liner, preferably, should have an L or J-shaped configuration including an annular portion interposed between the packing member and the periphery of the lens and a flange portion interposed between the flange portion of the packing member and the inner housing section.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A sight glass assembly comprising a first housing section having an opening therethrough, mountable on a vessel wall having an opening therein so that said first housing section opening registers with said vessel wall opening, said opening of said first housing section having an enlarged section, a second housing section cooperable with said first housing section, having an opening therethrough registered with the opening in said first housing section, said opening in said second housing section having an enlarged section disposed in opposed relation to the enlarged section of the opening in said first housing section, a lens disposed across said openings having the periphery thereof disposed between said housing sections and received within said enlarged sections of the openings of said housing sections, a sealing ring assembly disposed in the enlarged sections of said housing section openings, including a rigid compression ring and a resilient packing member, said compression ring being engageable with one of said housing sections, said packing member having an L-shaped cross-sectional configuration including an annular wall portion mounted on an inner side of said compression ring and engaging the periphery of said lens and a flange portion mounted on an end of said compression ring and engaging the other of said housing sections, and means for urging said housing sections together so that said compression ring will be forced against said packing member, causing it to expand laterally, thereby effecting a seal between the periphery of the lens and said housing sections and placing said lens in radial compression.

2. A sight glass assembly according to claim 1 including gaskets interposed between the periphery of said lens and each of said housing sections.

3. A sight glass assembly according to claim 1 in which the flange portion of said packing member is provided with an annular recess and said compression ring includes an annular portion received within said recess.

4. A sight glass assembly according to claim 1 wherein the enlarged section of said first housing section includes a sidewall disposed at an angle relative to the peripheral wall of said lens.

5. A sight glass assembly according to claim 4 wherein the flange portion of said packing member includes an annular recess and said compression ring includes an annular portion received within said recess.

6. A sight glass assembly according to claim 1 wherein said housing sections include external peripheral bearing surfaces, converging laterally outwardly, and wherein said urging means comprises a clamp assembly including a pair of clamp members hinged together at one set of ends thereof, said clamping members having laterally inwardly diverging surfaces engageable with said laterally outwardly converging bearing surfaces of said housing section and means for drawing said clamping members together whereby, upon manipulation of said drawing means, said housing sections will be forced together.

7. A sight glass assembly according to claim 6 wherein said means for drawing said clamping members together comprises a screw assembly.

8. A sight glass assembly according to claim 1 including a liner disposed between said lens and said packing member formed of a material impervious to the effects of any fluid contained within said vessel.

9. A sight glass assembly according to claim 8 wherein said liner has an L-shaped cross-sectional configuration including a first section interposed between said lens and said packing member and a second section interposed between said packing member and said first housing section.

10. A sight glass assembly according to claim 1 wherein said compressing ring is formed from a corrosive resistant material and said packing member is formed of an elastomer.

* * * * *